(12) United States Patent
Roy et al.

(10) Patent No.: US 10,200,842 B1
(45) Date of Patent: Feb. 5, 2019

(54) DEVICE MANAGEMENT FOR COMMUNICATION WITH MULTIPLE SHORT RANGE WIRELESS COMMUNICATION DEVICES

(71) Applicant: Accenture Global Solutions Limited, Dublin (IE)

(72) Inventors: Subhasish Roy, Bangalore (IN); Mukunda Ram Bhuyan, Bangalore (IN); Sudipta Mukhopadyaya, Bangalore (IN); Bibin George Thottikkara, Bangalore (IN)

(73) Assignee: Accenture Global Soltuions Limited, Dublin (IE)

( * ) Notice: Subject to any disclaimer, the term of this patent is extended or adjusted under 35 U.S.C. 154(b) by 0 days.

(21) Appl. No.: 15/844,090

(22) Filed: Dec. 15, 2017

(51) Int. Cl.
| *H04B 7/00* | (2006.01) |
| *H04W 4/80* | (2018.01) |
| *H04W 8/00* | (2009.01) |
| *H04W 76/15* | (2018.01) |
| *H04L 29/08* | (2006.01) |
| *H04W 68/00* | (2009.01) |

(52) U.S. Cl.
CPC ............ *H04W 4/80* (2018.02); *H04W 8/005* (2013.01); *H04W 76/15* (2018.02); *H04L 67/12* (2013.01); *H04W 68/00* (2013.01)

(58) Field of Classification Search
CPC ........ H04W 4/80; H04W 76/15; H04W 8/005; H04W 68/00; H04L 67/12
See application file for complete search history.

(56) References Cited

U.S. PATENT DOCUMENTS

| 2005/0102167 A1* | 5/2005 | Kapoor | A61B 5/0006 705/3 |
| 2014/0379368 A1* | 12/2014 | Kim | G06Q 50/22 705/2 |
| 2018/0137247 A1* | 5/2018 | Bore | A61B 5/0022 |

* cited by examiner

*Primary Examiner* — Xin Jia
(74) *Attorney, Agent, or Firm* — Harrity & Harrity, LLP

(57) ABSTRACT

An example device manager gateway includes one or more memories; and one or more processors, communicatively couple to the one or more memories, to identify a plurality of short range wireless communication devices; cause a plurality of short range wireless communication sessions to be established, the plurality of short range wireless communication sessions being established with the plurality of short range wireless communication devices; determine services associated with the plurality of short range wireless communication devices; identify an association between two or more of the short range wireless communication devices of the plurality of short range wireless communication devices; aggregate data associated with the services based on the association between two or more short range wireless communication devices of the plurality of short range wireless communication devices; and/or perform an action associated with the aggregated data and the two or more short range wireless communication devices.

20 Claims, 6 Drawing Sheets

130
A single user device and/or single application is used to access various types of subject Bluetooth devices that are associated with various manufacturers

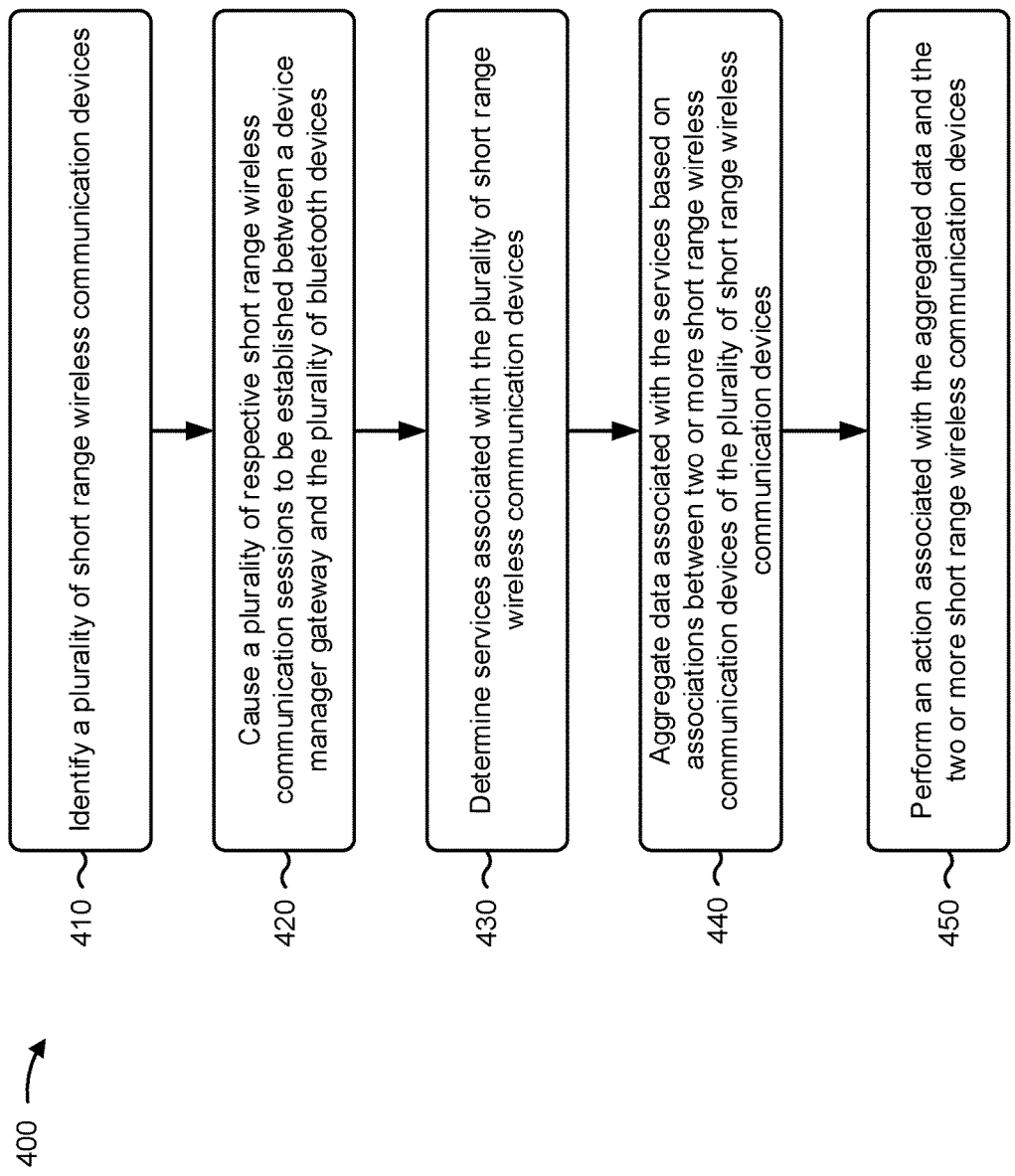

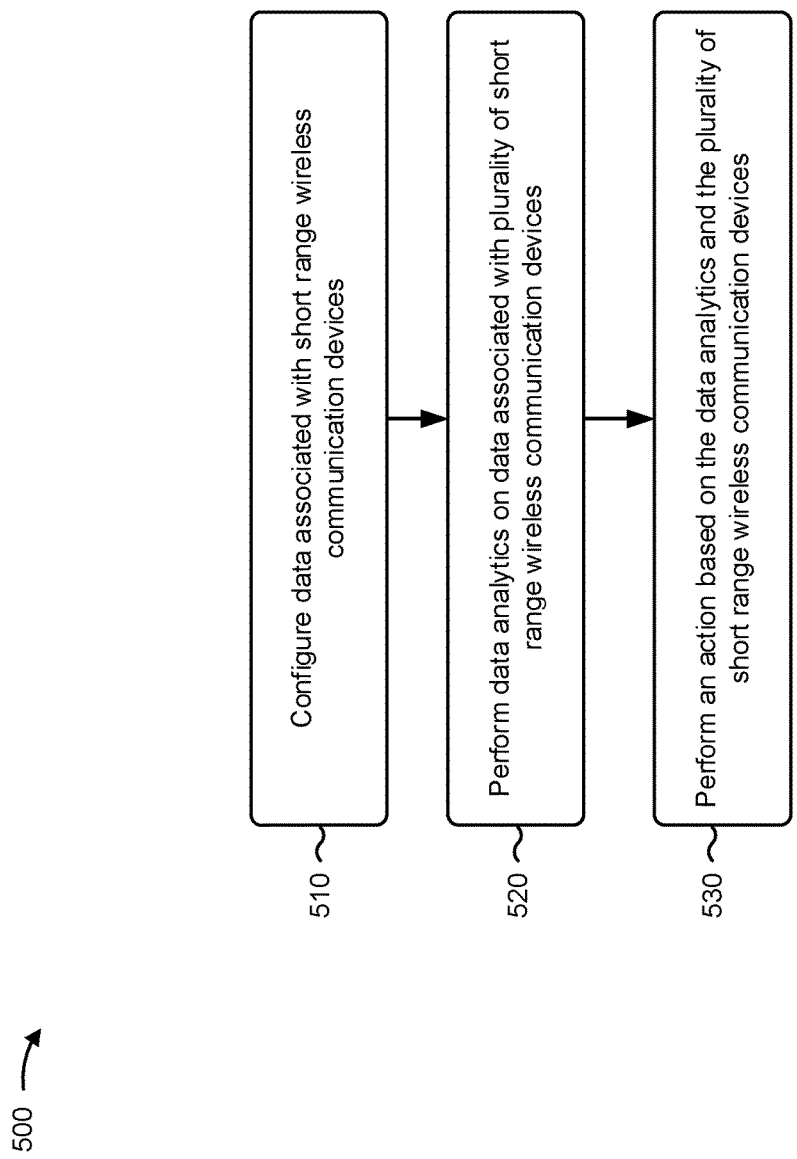

DEVICE MANAGEMENT FOR COMMUNICATION WITH MULTIPLE SHORT RANGE WIRELESS COMMUNICATION DEVICES

BACKGROUND

Short range wireless communication enables wireless communication over relatively short distances (e.g., within 30 meters). For example, BLUETOOTH® is a wireless technology standard for exchanging data over short distances using short-wavelength ultra high frequency (UHF) radio waves from 2.4 gigahertz (GHz) to 2.485 GHz. BLUETOOTH® low energy (BLE) is a form of BLUETOOTH® communication that allows for communication with devices running on low power. In some instances, a user device may use a BLUETOOTH® communication session and/or a BLE communication session to communicate with and/or access information from a BLUETOOTH® and/or a BLE enabled device.

SUMMARY

According to some implementations, a device manager gateway may include one or more memories; and one or more processors, communicatively couple to the one or more memories, to identify a plurality of short range wireless communication devices; cause a plurality of short range wireless communication sessions to be established, the plurality of short range wireless communication sessions being established with the plurality of short range wireless communication devices; determine services associated with the plurality of short range wireless communication devices; identify an association between two or more of the short range wireless communication devices of the plurality of short range wireless communication devices; aggregate data associated with the services based on the association between two or more short range wireless communication devices of the plurality of short range wireless communication devices; and perform an action associated with the aggregated data and the two or more short range wireless communication devices.

According to some implementations, a method may include identifying, by a device, a plurality of short range wireless communication devices; causing, by the device, a plurality of short range wireless communication sessions to be established, the plurality of short range wireless communication sessions being established between a device manager gateway and corresponding short range wireless communication devices of the plurality of short range wireless communication devices; determining, by the device, services associated with the plurality of short range wireless communication devices; identifying, by the device, an association between two or more of the short range wireless communication devices of the plurality of short range wireless communication devices; sorting, by the device, data associated with the services based on the association between the two or more short range wireless communication devices of the plurality of short range wireless communication devices; and/or performing, by the device, an action associated with the sorted data and the two or more short range wireless communication devices.

According to some implementations, a non-transitory computer-readable medium may store instructions that, when executed by one or more processors, cause the one or more processors to identify a plurality of short range wireless communication devices within range of a device manager gateway; cause a plurality of short range wireless communication sessions to be established, the plurality of short range wireless communication sessions being established with the plurality of short range wireless communication devices; determine services associated with the plurality of short range wireless communication devices, where the services provide data associated with the plurality of short range wireless communication devices; identify an association between two or more of the short range wireless communication devices of the plurality of short range wireless communication devices; aggregate the data associated with the plurality of short range wireless communication devices based on the association between two or more short range wireless communication devices of the plurality of short range wireless communication devices; and/or perform an action associated with the aggregated data and the two or more short range wireless communication devices.

BRIEF DESCRIPTION OF THE DRAWINGS

FIG. 4 is a flow chart of an example process for managing communication with multiple short range wireless communication devices; and FIG. 5 is a flow chart of an example process for managing information associated with multiple short range wireless communication devices.

DETAILED DESCRIPTION

Figure 1A:
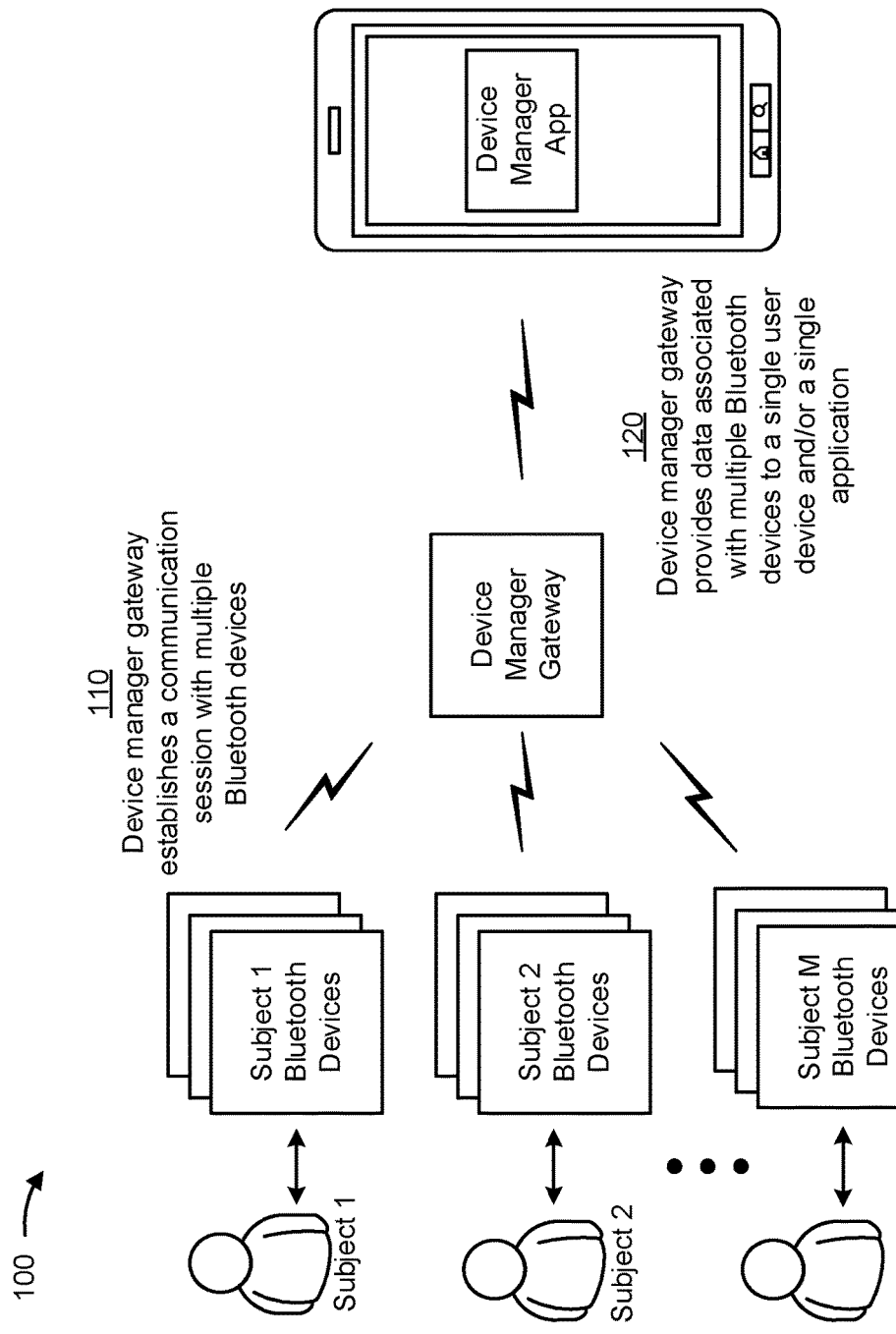
FIGS. 1A and 1B are diagrams of an overview of an example implementation described herein.

The following detailed description of example implementations refers to the accompanying drawings. The same reference numbers in different drawings may identify the same or similar elements.

In some instances, Internet of Things (IOT) devices, such as short range wireless communication devices (e.g., BLUETOOTH® devices, BLUETOOTH® Low Energy (BLE) devices, near field communication (NFC) devices, ultraband devices, ZIGBEE® devices, and/or the like) utilize individual, dedicated gateways and/or individual, dedicated applications in order to function, such that one or more of the gateways or one or more of the applications may not support more than one device or more than one type of device. For example, a first short range wireless communication device and a second short range wireless communication device may not be capable of interacting or communicating with a same user device or application of the user device based on services associated with the first short range wireless communication device and/or the second short range wireless communication device. In another example, a first short range wireless communication device manufactured by a first manufacturer may not communicate with an application associated with a second short range wireless communication device manufactured by a second manufacturer that is different from the first manufacturer. Accordingly, in many instances, establishing a connection between a short range wireless communication device and a device-specific application that is installed on a user device may be involved, such that connecting a new short range wireless communication device may involve installing a new corresponding application for the new short range wireless communication device on the user device. In some instances, short range wireless communication devices may be limited by a model of a user device to which they are capable of connecting. Furthermore, cloud layers may not have access to device connectivity information, and thus may not have access to reliable information or data associated with BLE devices. Some examples herein provide a device manager gateway and/or a device manager platform to allow multiple short range wireless communication devices, regardless of make, model, type, etc., to communicate or interact with a single user device and/or a single application of a user device.

According to some implementations described herein, a device manager gateway may simultaneously communicate with multiple short range wireless communication devices (e.g., of various types, that provide various services, that are manufactured by various manufacturers, etc.) to facilitate communication with the multiple short range wireless communication devices through a single application or platform. In some implementations, application programming interfaces (APIs) and/or API calls may be used to facilitate communication with the multiple short range wireless communication devices (e.g., for data transfers, for service control, and/or the like). In some implementations, data from multiple short range wireless communication devices may be aggregated, sorted, and/or reported for application consumption. Additionally, or alternatively, a device manager platform may provide offline data storage associated with the multiple short range wireless communication devices, data analytics (e.g., power consumption analytics, battery life analytics, battery usage analytics, and/or the like) associated with the short range wireless communication devices, and/or device or network failure management (e.g., notification, reconnection, and/or the like) associated with the multiple short range wireless communication devices. In some implementations, a device manager gateway and/or device manager platform may facilitate faster and more efficient onboarding of new short range wireless communication devices relative to previous techniques.

Accordingly, some implementations herein may conserve computing resources, network resources, and/or hardware resources by enabling a single user device and/or a single application to communicate with multiple short range wireless communication devices. As such, the single user device may use less network resources and require less hardware (i.e., less actual devices) to communicate with the multiple short range wireless communication devices and/or a single application may use less computing resources of a device to communicate with the multiple short range wireless communication devices of a user device than multiple application used to communicate with multiple corresponding short range wireless communication devices.

Figure 1B:
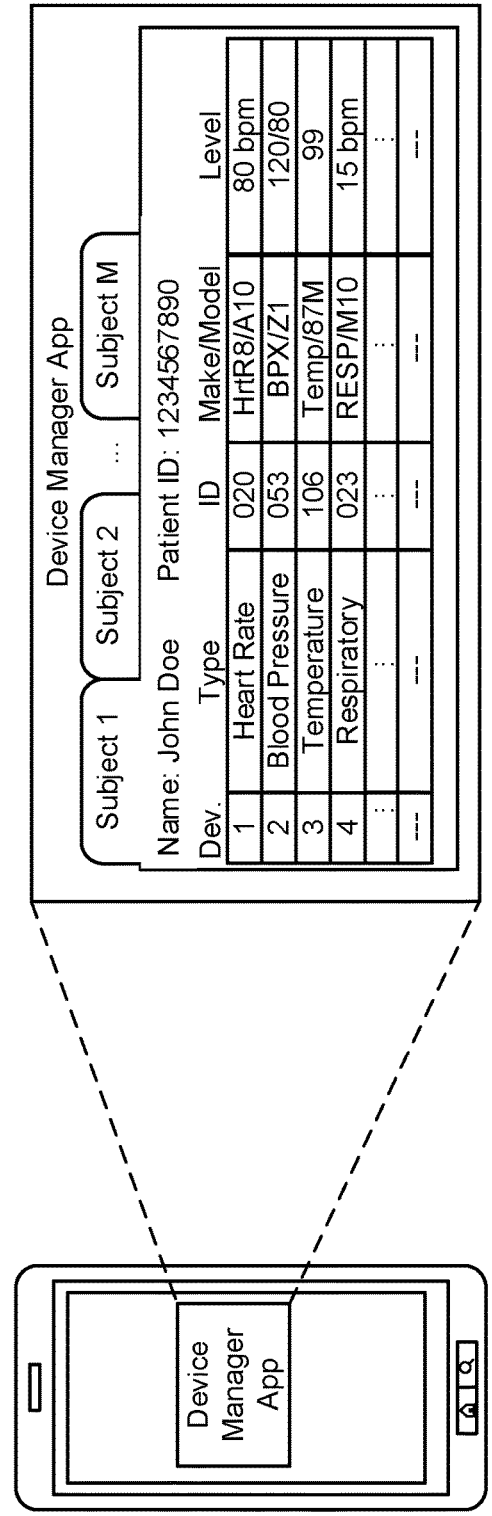

FIGS. 1A and 1B are diagrams of an overview of an example implementation 100 described herein. As shown in FIGS. 1A and 1B, a device manager gateway enables communication between multiple BLUETOOTH® devices and a single user device and/or a single application of the user device.

As shown in FIG. 1A, and by reference number 110, the device manager gateway establishes a communication session with multiple BLUETOOTH® devices (which may be referred to collectively as "subject BLUETOOTH® devices"). For example, the device manager gateway may detect that the subject BLUETOOTH® devices are powered on, are activated, are transmitting a synchronization signal, and/or are within range of the device manager gateway. Once detected, the device manager gateway establishes the communication session according to implementations described herein. In example implementation 100 of FIG. 1A, multiple sets of the subject BLUETOOTH® devices are associated with (e.g., owned by, monitored by, connected to, attached to, and/or the like) Subject 1 through Subject M (M≥1 (hereinafter referred to collectively as "subjects" and individually as "a subject"). The subjects may be individuals (e.g., people, such as customers, patients, residents, and/or the like), machines (e.g., manufacturing equipment or robots, vehicles or machines of vehicles, drones or machines of drones, equipment, and/or the like), projects (e.g., data sets, documents, data structures, and/or the like), and/or the like. As shown, Subject 1 is associated with a set of Subject 1 BLUETOOTH® devices, Subject 2 is associated with a set of Subject 2 BLUETOOTH® devices, and so on. The sets of subject BLUETOOTH® devices may include one or more BLUETOOTH® devices. In a specific example, the users may be patients, of a hospital or health care system, that are monitored by the corresponding BLUETOOTH® devices (e.g., a BLUETOOTH® enabled pulse rate monitor, a BLUETOOTH® enabled thermometer, a BLUETOOTH® enabled respiratory monitor, a BLUETOOTH® enabled blood pressure monitor, and/or other healthcare related monitors).

As further shown in FIG. 1A, and by reference number 120, the device manager gateway provides data associated with the subject BLUETOOTH® devices to a single user device and/or a single application (shown as Device Manager App on a user interface of the user device). For example, device manager gateway may receive or obtain information from the subject BLUETOOTH® devices and forward the information to the single user device and/or single user application. Accordingly, the user device may not necessarily include multiple applications to communicate with respective BLUETOOTH® devices of the multiple subject BLUETOOTH® devices (or with respective types of BLUETOOTH® devices of the multiple BLUETOOTH® devices). In some implementations, the device manager gateway may utilize application programming interfaces (APIs) to interact with and/or communicate with the multiple BLUETOOTH® devices. Referring to the example above, a user (e.g., a doctor, a nurse, and/or the like) may access vital signs (e.g., pulse rate, temperature, respiration rate, and blood pressure, and/or the like) of the subjects from the single user device and/or from a single application of the user device. In some implementations, the information provided, from the subject BLUETOOTH® devices to the user, may facilitate or enable the user to identify, be notified of, and/or address a health-related issue of the subject (e.g., a past, present, or future health-related issue).

As shown in FIG. 1B, and by reference number 130, the single user device and/or single application is used to access various types of subject BLUETOOTH® devices that are associated with various manufacturers. For example, as shown in example implementation 100 in FIG. 1B, Subject 1 is associated with four subject BLUETOOTH® devices. The subject BLUETOOTH® devices each have a different type (e.g., to monitor heart rate, to monitor blood pressure, to monitor temperature, and to monitor respiration). Furthermore, as shown in example implementation 100 of FIG. 1B, each of the subject BLUETOOTH® devices are associated with a different Make (i.e., manufacturer) and model of manufacture. Accordingly, a user may access the vital signs of the subjects. In some implementations, the vital signs may be presented as a number, a graph, a chart, and/or the like.

Accordingly, as shown by example implementation 100 of FIGS. 1A and 1B, the single device manager application of the single user device, using information from the device manager gateway of FIG. 1A, enables a single platform to access data and/or information from multiple different types of BLUETOOTH® devices manufactured by multiple different manufacturers. Accordingly, network resources may be conserved by avoiding transmissions from multiple separate BLUETOOTH® devices to multiple separate user devices (e.g., if the user device is at a remote location from the BLUETOOTH® devices). Furthermore, computing resources of a user device may be conserved by running a single application for the multiple BLUETOOTH® devices, rather than multiple applications corresponding to each of the different BLUETOOTH® devices. As such, performance of the network and/or user device may be enhanced over previous techniques.

As indicated above, FIGS. 1A and 1B are provided merely as an example. Other examples are possible and may differ from what was described with regard to FIGS. 1A and 1B. Furthermore, while the example implementation 100 focuses on BLUETOOTH® communication, implementations described herein are equally applicable to other types of short range wireless communications, such as near field communication (NFC), short range wireless communication low energy (BLE), infrared communication, ultraband communication, ZIGBEE® communication, and/or the like.

Figure 2:
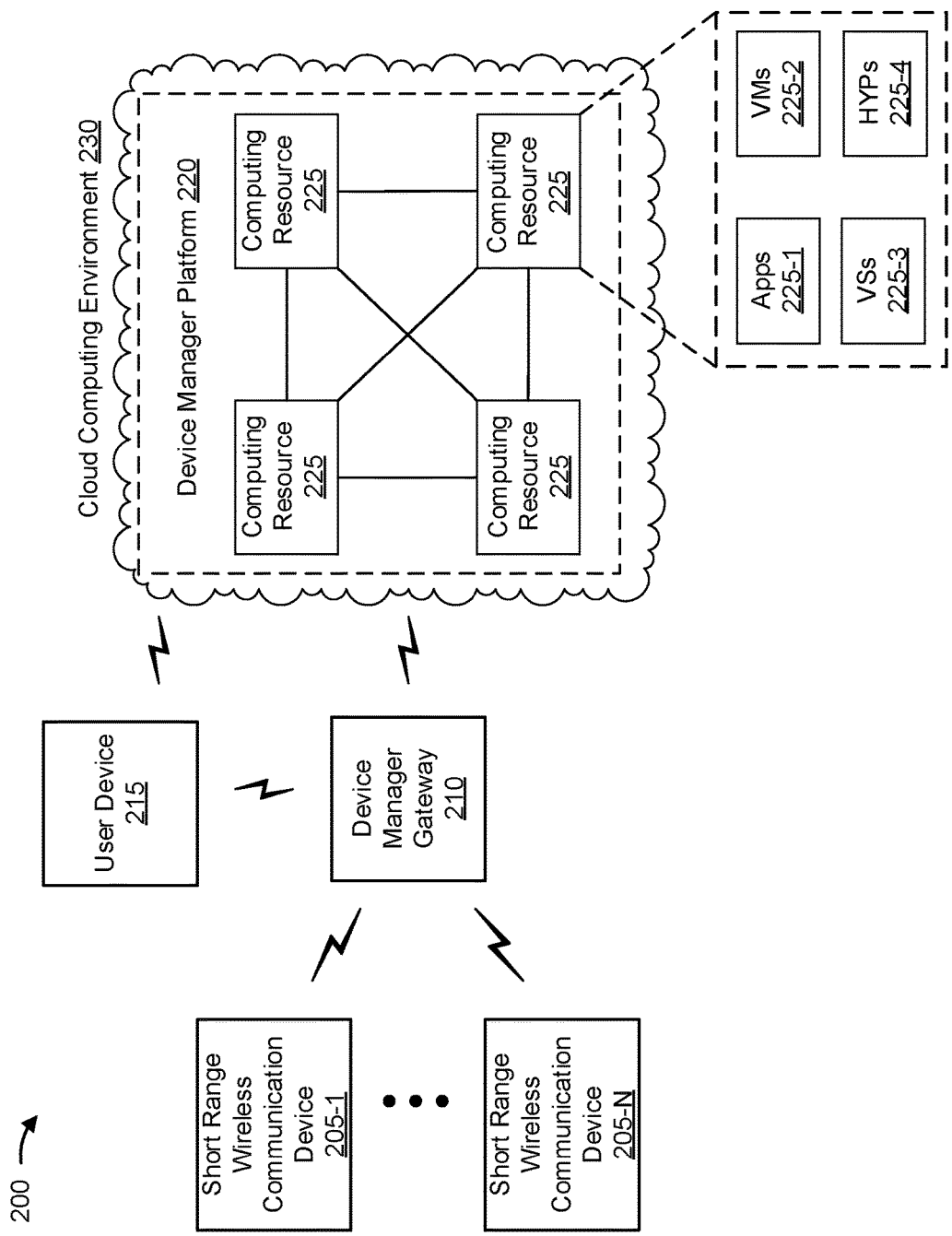
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a short range wireless communication device 205-1 through 205-N(N≥1) (hereinafter referred to collectively as "short range wireless communication devices 205," and individually as "short range wireless communication device 205"), a device manager gateway, a user device 215, and a device manager platform 220 hosted in a cloud computing environment 230. Devices of environment 200 may interconnect via wired connections, wireless connections, or a combination of wired and wireless connections.

Short range wireless communication device 205 includes any device capable of receiving, generating, storing, processing, and/or providing information associated with a short range wireless communication session. For example, short range wireless communication device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), an Internet of Things (IoT) device, a monitoring device, a sensor, or a similar type of device.

According to some implementations, short range wireless communication devices 205 may transfer and/or receive data according to a Generic Attribute (GATT) profile (e.g., a BLUETOOTH® GATT). The GATT profile may include or identify one or more services associated with the data and/or one or more characteristics associated with the one or more services associated with the data. For example, an attribute protocol (ATT) may store information identifying the one or more services, the one or more characteristics, and the associated data in a data structure (e.g., a table, such as a lookup table, an index, a graph, and/or the like).

Accordingly, in some implementations, a GATT transaction of short range wireless communication device 205 (e.g., a receipt of data, a transmission of data, an exchange of data, and/or the like) may include profiles, services, and characteristics (which may be referred to collectively as "nested objects"). As used herein, a profile may include information related to a pre-defined collection of services that have been compiled by a standard associated with short range wireless communication device 205 or a design feature of short range wireless communication device 205. A service breaks data of short range wireless communication device 205 into logic entities and includes specific chunks of data called characteristics. A service may have one or more characteristics and each service may be distinguished from other services using a unique numeric ID (e.g., a universally unique identifier (UUID)), which can be, for example, 16-bit (e.g., for adopted BLUETOOTH® services) or 128-bit (e.g., for custom services). The characteristic may be a lowest level unit of GATT that encapsulates a single data point (or an array of related data (e.g., x, y, z coordinates of a 3-axis accelerometer of one of short range wireless communication devices 205)). Similar to services, each characteristic may be distinguished via, for example, a pre-defined 16-bit or 128-bit unique numeric ID (e.g., a UUID), and standard characteristics may be associated with a standard associated with short range wireless communication device 205 (e.g., which may ensure interoperability across BLE-enabled hardware/software) or custom characteristics may be defined to be associated with short range wireless communication device 205 (which may only be used with that particular short range wireless communication device 205 and/or corresponding software associated with the particular short range wireless communication device 205).

Device manager gateway 210 includes one or more devices capable of receiving, generating, storing, processing, aggregating, and/or providing information associated with short range wireless communication. For example, device manager gateway 210 may include a short range wireless communication receiver device, a short range wireless communication access point, a short range wireless communication enabled user device (e.g., similar to user device 215), or a similar type of device. Device manager gateway 210 may facilitate transmission or receive of data from short range wireless communication devices 205 via GATT transactions, as described above.

User device 215 includes one or more devices capable of receiving, generating, and storing, processing, and/or providing information associated with accessing data from short range wireless communication devices 205. For example, user device 215 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. According to some implementations, user device 215 may be capable of hosting an application to access information from short range wireless communication devices 205.

Device manager platform 220 may include a server device or group of server devices. In some implementations, device manager platform 220 may be hosted in cloud computing environment 230. Notably, while implementations described herein describe device manager platform 220 as being hosted in cloud computing environment 230, in some implementations, device manager platform 220 may not be cloud-based or may be partially cloud based.

Cloud computing environment 230 includes an environment that delivers computing as a service, whereby shared resources, services, etc. may be provided to short range wireless communication devices 205, device manager gateway 210, and/or user device 215. Cloud computing environment 230 may provide computation, software, data access, storage, and/or other services that do not require end-user knowledge of a physical location and configuration of a system and/or a device that delivers the services. As shown, cloud computing environment 230 may include device manager platform 220; computing resource 225; APPS 225-1; VMs 225-2; VSs 225-3; and HYPs 225-4.

Computing resource 225 includes one or more personal computers, workstation computers, server devices, or another type of computation and/or communication device. In some implementations, computing resource 225 may host device manager platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 215. Application 225-1 may eliminate a need to install and execute the software applications on user device 215. For example, application 225-1 may include software associated with device manager platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 215), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as an example. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
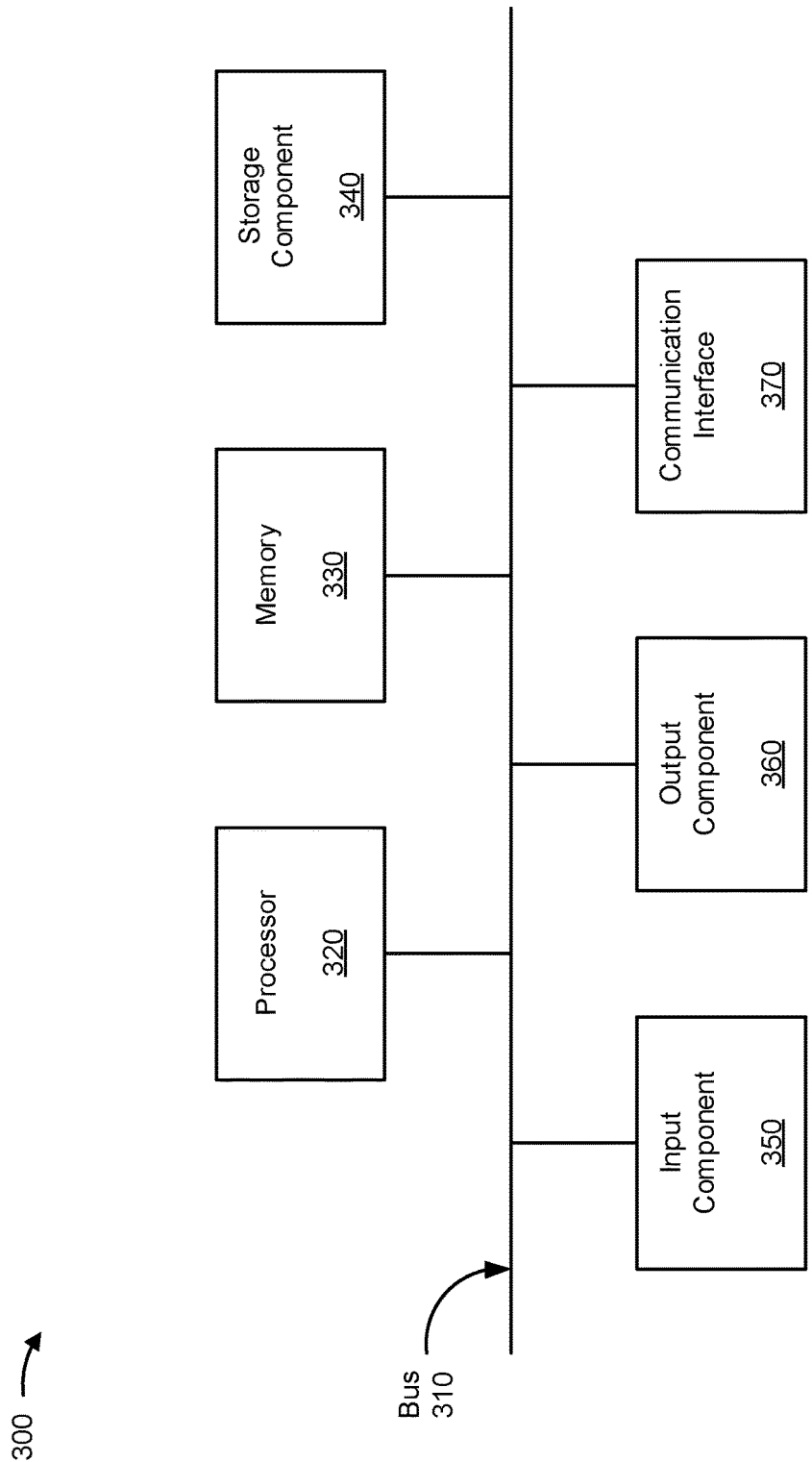
FIG. 3 is a diagram of example components of one or more devices of FIG. 2.

FIG. 3 is a diagram of example components of a device 300. Device 300 may correspond to short range wireless communication device 205, device manager gateway 210, user device 215, and/or computing resource 225. In some implementations, short range wireless communication device 205, device manager gateway 210, user device 215, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing communication with multiple short range wireless communication devices. In some implementations, one or more process blocks of FIG. 4 may be performed by device manager gateway 210. In some implementations, one or more process blocks of FIG. 4 may be performed by another device or a group of devices separate from or including device manager gateway 210, such as short range wireless communication devices 205, user device 215, or device manager platform 220.

As shown in FIG. 4, process 400 may include identifying a plurality of short range wireless communication devices (block 410). For example, device manager gateway 210 may identify short range wireless communication devices 205 that are within communication range of device manager gateway 210. In some implementations, device manager gateway 210 may identify short range wireless communication devices 205 when in a scanning mode or a detection mode (e.g., based on user input, based on a schedule, based on an event associated with short range wireless communication devices 205, and/or the like) that enables device manager gateway 210 to identify short range wireless communication devices 205.

As used herein, short range wireless communication may include BLUETOOTH® communication, BLUETOOTH® Low Energy (BLE) communication, near field communication (NFC) communication, ultraband communication, ZIG-BEE® communication, and/or the like. As such, short range wireless communication devices may be manufactured, designed, and/or modified to communicate using communication protocols associated with BLUETOOTH® Low Energy (BLE) communication, near field communication (NFC) communication, ultraband communication, ZIG-BEE® communication, and/or the like.

In some implementations, device manager gateway 210 may monitor a radio frequency range associated with short range wireless communication devices 205. For example, device manager gateway 210 may monitor the radio frequency range to detect signals associated with short range wireless communication devices 205 indicating that the short range wireless communication devices 205 are attempting to establish a short range wireless communication session. In some implementations, device manager gateway 210 may identify short range wireless communication devices 205 based on receiving a synchronization signal from short range wireless communication devices 205, based on receiving a GATT profile from short range wireless communication devices 205, based on short range wireless communication devices 205 being powered on, based on short range wireless communication devices 205 being activated to communication with device manager gateway 210, based on short range wireless communication devices 205 coming within range of device manager gateway 210, and/or the like.

According to some implementations, short range wireless communication devices 205 identified by device manager gateway 210 may be associated with different manufacturers, may be different types of short range wireless communication devices 205, may provide data associated with different services, and/or the like. In some implementations, device manager gateway 210 may identify an identifier associated with each of the short range wireless communication devices 205 in order to individually track data or information associated with the short range wireless communication devices 205. As such, device manager gateway 210 may maintain a data structure (e.g., a table, an index, a graph, and/or the like) to sort and/or organize data or information received from corresponding short range wireless communication devices 205.

In this way, device manager gateway 210 may identify short range wireless communication devices 205 to enable device manager gateway 210 to establish short range wireless communication sessions with the short range wireless communication devices.

As further shown in FIG. 4, process 400 may include causing a plurality of respective short range wireless communication sessions to be established between the device manager gateway and the plurality of short range wireless communication devices (block 420). For example, device manager gateway 210 may cause the short range wireless communication sessions to be established with short range wireless communication devices 205. In some implementations, device manager gateway 210 may cause the short range wireless communication sessions to be established based on identifying short range wireless communication devices 205.

According to some implementations, a short range wireless communication session is established between device manager gateway 210 and short range wireless communication device 205 when the short range wireless communication device 205 and device manager gateway 210 are capable of exchanging data, such as service data or characteristic data associated with short range wireless communication device 205. In some implementations, an established short range wireless communication session may be maintained according to a standard (e.g., a short range wireless communication standard) or a design associated with short range wireless communication device 205 and/or device manager gateway 210.

Some implementations described herein may include device manager gateway 210 using any suitable short range wireless communication protocol to cause a short range wireless communication session to be established with short range wireless communication device 205. In some implementations, device manager gateway 210 may cause a short range wireless communication session to be established based on sending and/or receiving one or more signals. For example, such signals may include synchronization signals, pairing signals, acknowledgement (ACK) signals, non-acknowledgement (NACK) signals, and/or the like to establish a short range wireless communication session.

In this way, device manager gateway 210 may cause a short range wireless communication session to be established with short range wireless communication devices 205 to enable device manager gateway 210 to determine a service associated with each of the short range wireless communication devices 205.

As further shown in FIG. 4, process 400 may include determining services associated with the plurality of short range wireless communication devices (block 430). For example, device manager gateway 210 may determine a service associated with each short range wireless communication device 205. In some implementations, device manager gateway 210 may determine one or more services associated with each short range wireless communication device 205 based on establishing a short range wireless communication session with that short range wireless communication device 205.

A service associated with short range wireless communication device 205 may facilitate receiving control information from or associated with an application (e.g., an application hosted by user device 215 and/or device manager platform 220), facilitating establishing a communication session with another short range wireless communication device (e.g., device manager gateway 210), receiving data (e.g., data associated with a sensor and/or other monitoring device of short range wireless communication device 205), and/or forwarding the data to device manager gateway 210. In some implementations, the service may enumerate an associated short range wireless communication device 205 and/or a sensor or monitoring device of short range wireless communication device 205, discover the sensor or the monitoring device of short range wireless communication device 205, and/or connect to the sensor and/or the monitoring device to receive the data. As mentioned above, the service may include one or more characteristics (e.g., an element of the service that provides a value). For example, a service associated with speed may include characteristics representative of time and/or distance, a service associated with heart rate may include characteristics representative of a number of heart beats and a time period associated with the number of heart beats, and/or the like.

In some implementations, a service associated with short range wireless communication device 205 may be a standard service (e.g., a short range wireless communication standard service) or a custom service (e.g., a service that is designed for a specific short range wireless communication device 205 or a type of short range wireless communication device 205 that is not a standard type of short range wireless communication device 205). A standard service may include, for example, a generic access service, an alert notification service, an automation input/output (IO) service, a battery service, a blood pressure service, a body composition service, a bond management service, a continuous glucose monitoring service, a current time service, a cycling power service, a cycling speed and cadence service, a device information service, an environmental sensing service, a fitness machine service, a generic attribute service, a glucose service, a health thermometer service, a heart rate service, a hypertext transfer protocol (HTTP) proxy service, a human interface device service, an immediate alert service, an indoor positioning service, an internet protocol (IP) support service, a link loss service, a location and navigation service, a mesh provisioning service, a mesh proxy service, a next daylight savings time (DST) change service, an object transfer service, a phone alert status service a pulse oximeter service, a reference time update service, a running speed and cadence service a scan parameters service, a transport discovery service a transmission (Tx) power service, a user data service, a weigh scale service, and/or the like.

According to some implementations, device manager gateway 210 determines a service based on receiving or identifying an identifier (e.g., a name, a number, and/or the like) associated with the within a communication of the short range wireless communication session. Additionally, or alternatively, the service may indicate or identify a particular short range wireless communication device 205 that is associated with the service. Accordingly, using information associated with the service and/or short range wireless communication devices 205, device manager gateway 210 may determine whether two or more short range wireless communication devices 205 are associated with a same individual, a same machine, a same project, a same organization, a same manufacturer, and/or a same location.

In some implementations, device manager gateway 210 may track and/or monitor the service and/or one or more characteristics of the service according to the short range wireless communication device 205 associated with the service. For example, device manager gateway 210 may maintain a data structure that indicates which services and/or corresponding characteristics are associated with which short range wireless communication devices 205. As such, device manager gateway 210 may cross-reference identifiers of services with services within the data structure to determine a service associated with short range wireless communication devices 205. For example, if a new short range wireless communication device 205 is placed in communication with device manager gateway 210, device manager gateway 210 may determine which services are associated with the new short range wireless communication device 205 by cross referencing received service identifiers with service identifiers in the data structure.

In this way, device manager gateway 210 may determine a service associated with each of short range wireless communication devices 205 to permit device manager gateway 210 to aggregate data from short range wireless communication devices 205 as described herein.

As further shown in FIG. 4, process 400 may include aggregating data associated with the services based on an association between two or more short range wireless communication devices of the plurality of short range wireless communication devices (block 440). For example, device manager gateway 210 may aggregate data associated with a group (e.g., two or more) of short range wireless communication devices 205 that are associated with one another (e.g., that are associated with a same subject, individual, machine, project, and/or the like). In some implementations, device manager gateway 210 may aggregate the data based on determining services associated with the short range wireless communication devices 205, based on receiving data associated with the service, based on receiving a request for aggregated data (e.g., from user device 215, from device manager platform 220, and/or the like).

An association may be defined based on a defined group of short range wireless communication devices 205 that share a relationship (e.g., an association of short range wireless communication devices 205 indicated to be associated with a same subject, a same group of subjects, a same organization, and/or the like), a location of short range wireless communication devices (e.g., an association of short range wireless communication devices 205 in a same geographical region, devices in a same building, devices in a same portion of a building, devices in a same room of a building, and/or the like), a type of the short range wireless communication devices 205 (e.g., an association of short range wireless communication devices 205 that are of a same type or associated with a same service), a manufacturer of devices 205 (e.g., an association of short range wireless communication devices that are manufactured by a same manufacturer or organization), and/or the like. An association may include one or more short range wireless communication devices 205. As such, device manager gateway 210 may determine that two or more short range wireless communication devices 205 are associated with a same association based on information or data of a service and/or identification information (e.g., for a defined association) from short range wireless communication devices 205.

According to some implementations, device manager gateway 210 may aggregate data from short range wireless communication devices 205 by storing the data for a particular period of time (e.g., one minute, two minutes, ten minutes, one hour, one day, one week, one month, and/or the like). In some implementations, device manager gateway 210 may aggregate data by sorting the data according to associations of short range wireless communication devices 205. For example, device manager gateway 210 may sort the data for a group of short range wireless communication devices 205 that are monitoring a particular patient (or other type of subject, such as another type of individual, a machine, a project, and/or the like) to enable a user (e.g., a doctor or nurse) to remotely monitor the patient via short range wireless communication devices 205. As another example, device manager gateway 210 may sort the data for a group of short range wireless communication devices 205 that are owned and/or manufactured by a particular organization (e.g., a manufacturer, an organization using short range wireless communication devices 205 to monitor subjects, and/or the like) to enable the organization to determine a status (e.g., remaining battery life, performance or error, usage rate) associated with that group of short range wireless communication devices 205. Accordingly, device manager gateway 210 may facilitate remote, real-time monitoring of short range wireless communication devices 205.

In this way, device manager gateway 210 may aggregate data associated with short range wireless communication devices 205 to enable device manager gateway 210 to perform an action associated with the aggregated data and/or short range wireless communication devices 205.

As further shown in FIG. 4, process 400 may include performing an action associated with the aggregated data and the two or more short range wireless communication devices (block 450). For example, device manager gateway 210 may perform the action. In some implementations, device manager gateway 210 may perform the action based on aggregating the data, based on receiving a request (e.g., from user device 215 or device manager platform 220) for the aggregated data, based on being scheduled to perform the action associated with the aggregated data, based on being placed in communication with user device 215 and/or device manager platform 220 (e.g., to stream the aggregated data to user device 215 and/or device manager platform 220), and/or the like.

In some implementations, device manager gateway 210 may perform an action that includes sending the aggregated data (or at least a portion of the aggregated data) to user device 215 and/or device manager platform 220. For example, device manager gateway 210 may send the aggregated data to user device 215 to enable user device 215 to have real-time access to the aggregated data associated with short range wireless communication devices 205. In such instances, device manager gateway 210 may provide edge computing and/or edge analytics to user device 215. As another example, device manager gateway 210 may send the aggregated data to device manager platform 220 for post processing of the aggregated data. For example, such post processing may include calculating percentages associated with device failure, communication failure, performance, and/or the like as described herein.

In some implementations, device manager gateway 210 may perform an action that includes sending a notification (e.g., a message, a text, an email, an image, a data file, and/or the like) associated with the aggregated data and/or short range wireless communication devices 205. For example, device manager gateway 210 may send a notification to user device 215 when the aggregated data associated with one or more of short range wireless communication devices 205 satisfies a threshold. In such a case, the threshold may indicate an emergency or a potential emergency associated with short range wireless communication devices 205 (e.g., an emergency associated with a subject (e.g., a patient) of short range wireless communication devices 205, an emergency associated with performance of short range wireless communication devices 205 (e.g., a high rate of sending erroneous data, high data loss rate, and/or the like), an emergency associated with operability of short range wireless communication devices 205 (e.g., low battery, low signal power, and/or the like), and/or the like). Accordingly, device manager gateway 210 may analyze content of the data to determine whether the content of the data indicates the emergency. As such, device manager gateway 210 may send a notification based on the content of data associated with short range wireless communication devices 205.

In some implementations, device manager gateway 210 may perform an action associated with controlling short range wireless communication devices 205. For example, device manager gateway 210 (e.g., in response to instructions from user device 215) may utilize one or more APIs to control one or more monitoring sessions of short range wireless communication devices 205. For example, a monitoring session of short range wireless communication device 205 includes a time period during which short range wireless communication device 205 may collect data or information from sensors or monitoring devices of short range wireless communication device 205. In some implementations, device manager gateway 210 may control a monitoring session of short range wireless communication device 205 by causing short range wireless communication device 205 to start a monitoring session, to stop a monitoring session, to pause a monitoring session, to resume a short range wireless communication, and/or the like. Additionally, or alternatively, device manager gateway 210 may perform an action associated with setting one or more configurations of one or more of short range wireless communication devices 205 for a monitoring session. For example, device manager gateway 210 may set a time interval configuration corresponding to how frequently device manager gateway 210 is to obtain data from short range wireless communication devices 205 for the monitoring session, an HTTP endpoint configuration (e.g., to manage a network communication associated with short range wireless communication devices 205, such as a network communication with device manager platform 220), setting a device ID for different sensors of short range wireless communication devices 205, and/or the like.

According to some implementations, device manager gateway 210 may configure a network communication associated with the aggregated data and/or short range wireless communication devices 205. For example, device manager gateway 210 may configure a network communication with device manager platform 220. Device manager gateway 210 may configure network communications based on a protocol (e.g., a HTTP, a HTTP with Secure Sockets Layer (SSL) (HTTPS), message query telemetry transport (MQTT), a web services security (WSS), and/or the like) of the network communication. Furthermore, device manager gateway 210 may address network disconnections and/or errors using the appropriate protocol.

In some implementations, device manager gateway 210 may address communication errors or network errors associated with short range wireless communication devices 205. For example, device manager gateway 210 may register an error event associated with short range wireless communication devices 205, initiate an error callback to the short range wireless communication devices 205, and/or the like. In some implementations, device manager gateway 210 may log information associated with the aggregated data and/or short range wireless communication devices 205. For example, the information may be logged for data analytics associated with short range wireless communication devices 205.

In this way, device manager gateway 210 may perform an action associated with the data and/or short range wireless communication devices 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for managing information associated with multiple short range wireless communication devices. In some implementations, one or more process blocks of FIG. 5 may be performed by device manager platform 220. In some implementations, one or more process blocks of FIG. 5 may be performed by another device or a group of devices separate from or including device manager platform 220, such as short range wireless communication device 205, device manager gateway 210, and/or user device 215.

As shown in FIG. 5, process 500 may include configuring data associated with the short range wireless communication devices (block 510). For example, device manager platform 220 may configure the data associated with short range wireless communication devices 205. In some implementations, device manager platform 220 may configure the data based on being in communication with device manager gateway 210, receiving the data (e.g., as aggregated data) from device manager gateway 210, based on a request (e.g., an API call from user device 215), and/or the like.

In some implementations, when configuring the data, device manager platform 220 may store the data associated with short range wireless communication devices 205 in a storage (e.g., VS 225-3) associated with device manager platform 220 and/or short range wireless communication devices 205. In such instances, the storage may facilitate offline storage to enable access to data associated with short range wireless communication devices 205 despite short range wireless communication devices 205 being offline (e.g., powered off, disconnected from device manager gateway 210, and/or the like). For example, device manager platform 220 may store the data in a shared buffer of device manager platform 220. Additionally, or alternatively, device manager platform 220 may timestamp the data stored in the shared buffer (e.g., based on when the data is received from short range wireless communication devices 205 and/or device manager gateway 210). In some implementations, when data associated with short range wireless communication devices 205 is to be recorded, the data may be stored in a recorder component that provides long term storage (e.g., long term relative to the shared buffer). In some implementations, device manager gateway 210 may indicate success or failure associated with the data (e.g., whether the data was successfully received, partially received, included errors, and/or the like).

In some implementations, device manager platform 220 may configure data to be obtained from short range wireless communication devices 205 and/or from device manager gateway 210 according to a schedule or based on events. For example, device manager platform 220 may configure data from one or more of short range wireless communication devices 205 to be obtained every second, every ten seconds, every minute, every ten minutes, every hour, and/or the like. Additionally, or alternatively, device manager platform 220 may configure data from one or more short range wireless communication devices 205 based on the data including a threshold value, indicating an emergency, based on when the data is obtained, and/or the like.

In this way, device manager platform 220 may configure data associated with short range wireless communication devices 205 to permit device manager platform 220 to perform data analytics associated with the data.

As shown in FIG. 5, process 500 may include performing data analytics on the data associated with the plurality of short range wireless communication devices (block 520). For example, device manager platform 220 may perform data analytics associated with data from short range wireless communication devices 205. In some implementations, device manager platform 220 performs data analytics based on configuring data associated with short range wireless communication devices 205, based on receiving data (or a threshold amount of data) from short range wireless communication devices 205, based on a request or instructions from user device 215, and/or the like.

In some implementations, device manager platform 220 may perform data analytics including calculating performance associated with short range wireless communication devices 205. For example, device manager platform 220 may determine a percentage of time that short range wireless communication devices 205 are online or offline during a particular time period (e.g., day, month, year, and/or the like). As another example, device manager platform 220 may determine battery life efficiency of short range wireless communication devices 205. For example, the battery life efficiency may be based on a usage of short range wireless communication devices 205 during a time period and a percentage of the time the short range wireless communication devices 205 were powered on during that time period.

In some implementations, device manager platform 220 may perform data analytics based on content of the data provided to device manager platform 220. For example, device manager platform 220 may calculate a percentage of the data that is erroneous (e.g., includes anomalies, is incomplete, and/or the like). In some implementations, device manager platform 220 may calculate statistics associated with the content. For example, the statistics may indicate percentages or lengths of time that characteristics of services of short range wireless communication devices 205 have particular values, are within particular ranges, and/or are above a particular threshold.

In this way, device manager platform 220 may perform data analytics on data associated with short range wireless communication devices 205 to permit device manager platform 220 to perform an action associated with the data analytics and/or short range wireless communication devices 205.

As shown in FIG. 5, process 500 may include performing an action based on the data analytics and the plurality of short range wireless communication devices (block 530). For example, device manager platform 220 may perform the action. In some implementations, device manager platform 220 may perform the action based on performing data analytics associated with short range wireless communication devices 205, receiving a request or instructions to perform the action from user device 215, receiving the data from device manager gateway 210, and/or the like.

In some implementations, the action may include providing results of the data analytics from the data of short range wireless communication devices 205 to user device 215. Additionally, or alternatively, the action may include generating a report corresponding to the data analytics. For example, device manager platform 220 may generate a document, a graph, a diagram, and image, and/or the like that presents results of the data analytics. In some implementations, the action may include storing results of the data analytics (e.g., in an offline storage associated with device manager platform 220)

In this way, device manager platform 220 may perform an action associated with data analytics calculated from data associated with short range wireless communication devices 205.

Accordingly, some implementations described herein provide a device management system, including a device manager gateway and a device manager platform, that enables multiple short range wireless communication devices to be accessed by and/or communicate with a single user device and/or a single user device application. Some implementations described herein enable real-time access to data and/or data analytics associated with the multiple short range wireless communication devices. As such, a single interface (e.g., a single application of a user device) may be used, conserving computing resources when communicating with (e.g. accessing data associated with the multiple short range wireless communication devices, sending configuration information, and/or the like) multiple short range wireless communication devices. Furthermore, network resources may be conserved, as a single user devices may be used to communicate with a plurality of short range wireless communication devices, rather than each short range wireless communication device communicating with a dedicated, corresponding user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device manager gateway, comprising:
   one or more memories; and
   one or more processors, communicatively couple to the one or more memories, to:

identify a plurality of short range wireless communication devices;
cause a plurality of short range wireless communication sessions to be established,
the plurality of short range wireless communication sessions being established with the plurality of short range wireless communication devices;
identify, for each of the plurality of short range wireless communication devices, a respective identifier included within a respective communication received from each of the short range wireless communication devices;
determine, based on the respective identifier, services associated with the plurality of short range wireless communication devices;
cross-reference a first identifier, associated with a first short range wireless communication device included in the plurality of short range wireless communication devices, with another identifier, associated with another short range wireless communication device included in the plurality of short range wireless communication devices, to determine at least one service associated with the first short range wireless communication device;
identify an association between two or more short range wireless communication devices of the plurality of short range wireless communication devices;
aggregate data associated with the services based on the association between the two or more short range wireless communication devices of the plurality of short range wireless communication devices,
the services including the at least one service; and
perform an action associated with the aggregated data and the two or more short range wireless communication devices.

2. The device manager gateway of claim 1, where the one or more processors are further to:
identify an identifier associated with data indicating the association,
where the one or more processors, when aggregating the data, are to:
sort the data based on the identifier.

3. The device manager gateway of claim 1, where the association between the two or more short range wireless communication devices correspond to at least one of:
a same individual,
a same machine,
a same project,
a same organization,
a same manufacturer, or
a same location.

4. The device manager gateway of claim 1, where the one or more processors are further to:
identify characteristics of the services associated with the two or more short range wireless communication devices; and
obtain values of the characteristics that are to be included within the aggregated data.

5. The device manager gateway of claim 1, where the one or more processors, when performing the action, are to:
send the aggregated data to a device manager platform,
the device manager platform performing data analytics on the aggregated data.

6. The device manager gateway of claim 1, where the one or more processors, when performing the action, are to:
send the aggregated data to a user device,
the user device displaying information associated with the two or more short range wireless communication devices based on the aggregated data.

7. The device manager gateway of claim 1, where the one or more processors, when performing the action, are to:
analyze content of the aggregated data; and
send a notification to a user device based on the content of the aggregated data.

8. The device manager gateway of claim 1, where the two or more short range wireless communication devices are at least one of:
associated with different manufacturers,
different types, or
provide data associated with different services.

9. A method, comprising:
identifying, by a device, a plurality of short range wireless communication devices;
causing, by the device, a plurality of short range wireless communication sessions to be established,
the plurality of short range wireless communication sessions being established between:
a device manager gateway, and
corresponding short range wireless communication devices of the plurality of short range wireless communication devices;
identifying, by the device and for each of the plurality of short range wireless communication devices, a respective identifier included within a respective communication received from each of the short range wireless communication devices;
determining, by the device and based on the respective identifier, services associated with the plurality of short range wireless communication devices;
cross-referencing, by the device, a first identifier, associated with a first short range wireless communication device included in the plurality of short range wireless communication devices, with another identifier, associated with another short range wireless communication device included in the plurality of short range wireless communication devices, to determine at least one service associated with the first short range wireless communication device;
identifying, by the device, an association between two or more short range wireless communication devices of the plurality of short range wireless communication devices;
sorting, by the device, data associated with the services based on the association between the two or more short range wireless communication devices of the plurality of short range wireless communication devices,
the service including the at least one service; and
performing, by the device, an action associated with the sorted data and the two or more short range wireless communication devices.

10. The method of claim 9, further comprising:
identifying data associated with a first service of the services,
where the first service is associated with a second short range wireless communication device of the two or more short range wireless communication devices; and
identifying data associated with a second service of the services,
where the second service is associated with a third short range wireless communication device of the two or more short range wireless communication devices,
where sorting the data comprises:

combining the data associated with the first service with the data associated with the second service based on the second short range wireless communication device and the third short range wireless communication device having a same association.

11. The method of claim 9, where the two or more short range wireless communication devices are at least one of:
associated with different manufacturers,
different types, or
provide data associated with different services.

12. The method of claim 9, where performing the action comprises:
controlling monitoring sessions associated with the two or more short range wireless communication devices.

13. The method of claim 9, where performing the action comprises:
sending the data to a user device,
the user device displaying information associated with the two or more short range wireless communication devices based on the data.

14. The method of claim 9, where performing the action comprises:
analyzing content of the data; and
sending a notification to a user device based on the content of the data.

15. A non-transitory computer-readable medium storing instructions, the instructions comprising:
one or more instructions that, when executed by one or more processors, cause the one or more processors to:
identify a plurality of short range wireless communication devices within range of a device manager gateway;
cause a plurality of short range wireless communication sessions to be established,
the plurality of short range wireless communication sessions being established with the plurality of short range wireless communication devices;
identify, for each of the plurality of short range wireless communication devices, a respective identifier included within a respective communication received from each of the short range wireless communication devices;
determine, based on the respective identifier, services associated with the plurality of short range wireless communication devices,
where the services provide data associated with the plurality of short range wireless communication devices;
cross-reference a first identifier, associated with a first short range wireless communication device included in the plurality of short range wireless communication devices, with another identifier, associated with another short range wireless communication device included in the plurality of short range wireless communication devices, to determine at least one service associated with the first short range wireless communication device;
identify an association between two or more short range wireless communication devices of the plurality of short range wireless communication devices;
aggregate the data associated with the plurality of short range wireless communication devices based on the association between two or more short range wireless communication devices of the plurality of short range wireless communication devices; and
perform an action associated with the aggregated data and the two or more short range wireless communication devices.

16. The non-transitory computer-readable medium of claim 15, where the one or more instructions, when executed by the one or more processors, further cause the one or more processors to:
receive, from a user device, a request for data associated with the two or more short range wireless communication devices,
where the one or more instructions, that cause the one or more processors to perform the action, further cause the one or more processors to:
send the aggregated data to the user device,
the user device displaying the aggregated data based on receiving the request.

17. The non-transitory computer-readable medium of claim 15, where the one or more instructions, that cause the one or more processors to perform the action, further cause the one or more processors to:
send the aggregated data to a device manager platform,
the device manager platform performing data analytics on the aggregated data.

18. The non-transitory computer-readable medium of claim 15, where the one or more instructions, that cause the one or more processors to perform the action, further cause the one or more processors to:
send the aggregated data to a user device,
the user device displaying information associated with the two or more short range wireless communication devices based on the aggregated data.

19. The non-transitory computer-readable medium of claim 15, where the one or more instructions, that cause the one or more processors to perform the action, further cause the one or more processors to:
analyze content of the aggregated data; and
send a notification to a user device based on the content of the aggregated data.

20. The non-transitory computer-readable medium of claim 15, where the association between the two or more short range wireless communication devices is based on the at least one service associated with the first short range wireless communication device.

* * * * *